United States Patent

Stahl et al.

[11] Patent Number: 5,493,217
[45] Date of Patent: Feb. 20, 1996

[54] LONGER-LASTING INDUCTIVE SENSOR WITH AN ELECTRICAL COIL HAVING IMPROVED LOAD-BEARING AND THERMAL PROPERTIES

[75] Inventors: Ulrich Stahl, Schwieberdingen; Uwe Katzenwadel, Oberriexingen, both of Germany

[73] Assignee: Robert Bosch GmbH, Stuttgart, Germany

[21] Appl. No.: 256,479

[22] PCT Filed: Dec. 18, 1993

[86] PCT No.: PCT/DE93/01217

§ 371 Date: Jul. 8, 1994

§ 102(e) Date: Jul. 8, 1994

[87] PCT Pub. No.: WO94/17417

PCT Pub. Date: Aug. 4, 1994

[30] Foreign Application Priority Data

Jan. 22, 1993 [DE] Germany .................. 43 01 595.6

[51] Int. Cl.$^6$ .................. G01B 7/30; G01P 3/488
[52] U.S. Cl. .................. 324/207.15; 324/173; 324/262; 324/207.12
[58] Field of Search .................. 324/207.11–207.15, 324/207.23, 207.25, 173–175, 166, 260–262; 336/92, 98, 110, 221

[56] References Cited

U.S. PATENT DOCUMENTS

| | | | |
|---|---|---|---|
| 4,680,543 | 7/1987 | Kohen | 324/173 X |
| 4,847,557 | 7/1989 | Saito et al. | 324/173 X |
| 5,039,942 | 8/1991 | Buchschmid et al. | 324/207.15 X |
| 5,121,056 | 6/1992 | Onishi et al. | 324/207.15 |
| 5,278,496 | 1/1994 | Dickmeyer et al. | 324/207.15 X |

FOREIGN PATENT DOCUMENTS

| | | |
|---|---|---|
| 8815367 | 4/1990 | Germany . |
| 3834649 | 4/1990 | Germany . |
| 4106104 | 9/1992 | Germany . |

*Primary Examiner*—Sandra L. O'Shea
*Assistant Examiner*—Warren S. Edmonds
*Attorney, Agent, or Firm*—Michael J. Striker

[57] ABSTRACT

The inductive sensor has an electrical coil (14) having winding end portions (114) and current conductors (15) having conductor end portions (115) which are electrically contacted by the winding end portions (114) of the coil in a contact region (18) in the sensor housing (10). A permanently elastic material (26), advantageously silicone, encloses the contact region (18) between the conductor end portions (115) and the winding end portions (114). A temperature-resistant circumferential element (28) bearing on the housing (10) also encloses the contact region (18). This circumferential element (28) can be a polyimide strip or heat-resistant adhesive tape. This inductive sensor allows temperature fluctuation cycles to be increased by up to four times without damaging the coil wire and improves sensor durability.

8 Claims, 1 Drawing Sheet

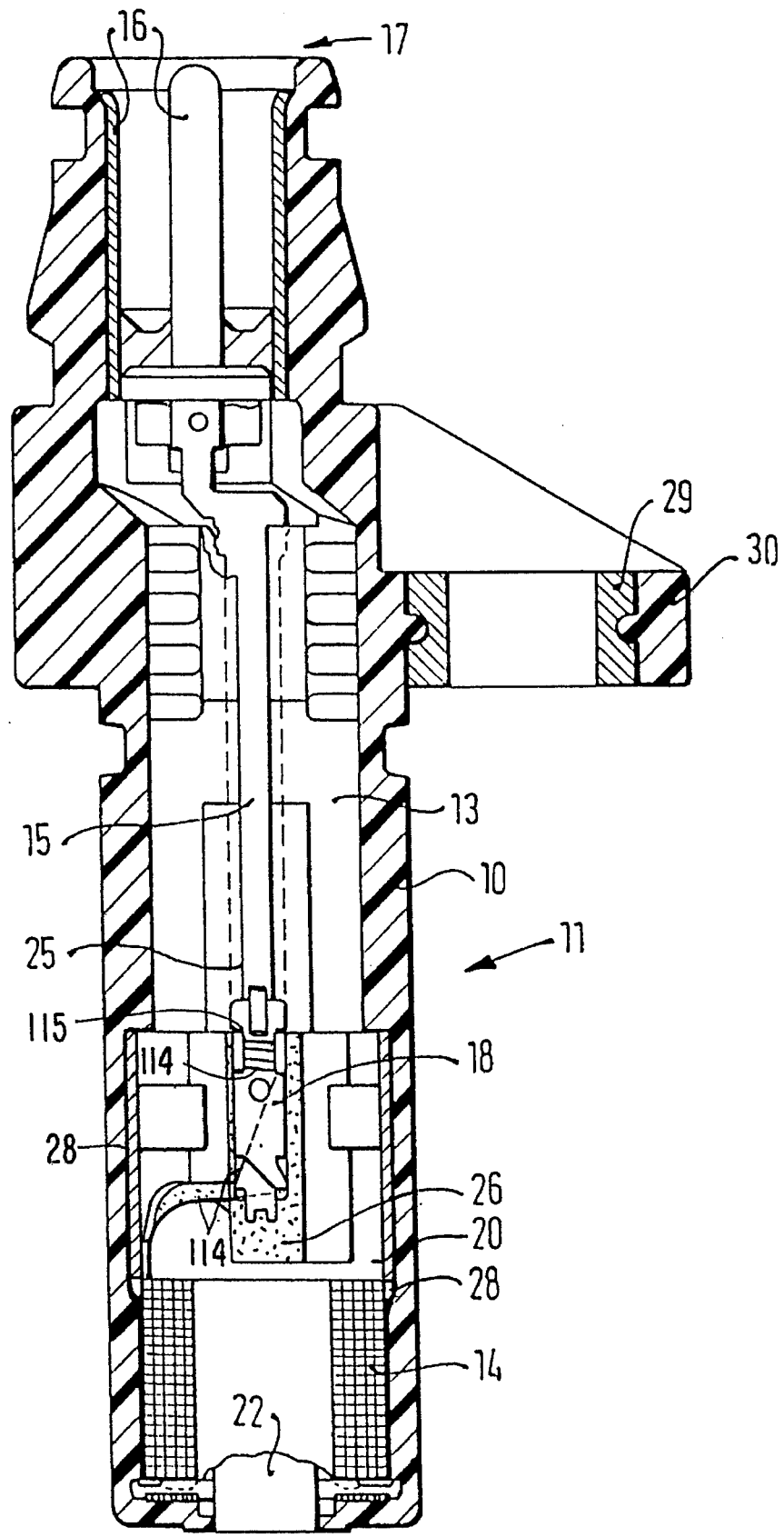

LONGER-LASTING INDUCTIVE SENSOR WITH AN ELECTRICAL COIL HAVING IMPROVED LOAD-BEARING AND THERMAL PROPERTIES

BACKGROUND OF THE INVENTION

The invention is based on an inductive sensor with an electric coil. In commonly used sensors, the surrounding injection molding compound is injected directly onto the region of the current conductor on which the ends of the windings of the coil are wound. Owing to the different expansion coefficients between the injection molding compound and the copper wire, a relative movement takes place between these two materials. Since the coil wire is constantly exposed to alternating load during changes in temperature, a fatigue fracture may occur in extreme cases. This results in a complete failure of the inductive sensor.

SUMMARY OF THE INVENTION

It is an object of the present invention to provide an inductive sensor with an electrical coil of the above-mentioned type which does not have the above-mentioned disadvantages.

According to the invention, the inductive sensor comprises a housing; a coil body and at least one coil arranged on the coil body, the coil body with the at least one coil being located inside the housing and the at least one coil including a winding having winding end portions; current conductors having conductor end portions and arranged in the housing, the conductor end portions electrically contacting the winding end portions of the windings in a contact region inside the housing; a permanently elastic material enclosing the contact region between the conductor end portions and winding end portions; and a circumferential element made of a temperature-resistant material and enclosing the contact region between the conductor end portions of the current conductors and the winding end portions of the windings of the at least one coil.

The inductive sensor, according to the invention, has the advantage over the prior art that the contacting end portions of the current conductors are embedded in a permanently elastic material and are protected from the surrounding injection molding compound by a temperature-resistent circumferential element. This creates an open space within the injection molded housing for the alternating load of the coil wire. The coil wire can expand freely. The temperature change cycles can also be quadrupled. In this way, an inductive sensor is obtained which can withstand high loads and has a long useful life.

The permanently elastic material is advantageously gel-like or gelatinous. Silicone is particularly preferred for this material.

The circumferential element is advantageously an adhesive tape that surrounds or covers the region where electrical contact between the winding end portions and the current conductors occurs. A polyimide strip or tape is particular preferred for this circumferential element, however it can also be an adhesive tape. The circumferential element can also be a thin sleeve of heat-resistant material.

BRIEF DESCRIPTION OF THE DRAWING

An embodiment example of the invention is shown in the drawing and described more fully in the following description. The drawing shows a cross-sectional view of a sensor according to the invention.

DESCRIPTION OF THE PREFERRED EMBODIMENT

In the drawing, a housing of a speed sensor 11 manufactured by an injection molding process is designated by 10. An elongated coil body 13 with a coil 14 having a winding is inserted in the housing 10. The winding of the coil 14 is connected electrically to two current conductors 15 (arranged one behind the other in the drawing). The upwardly projecting free ends of the current conductors 15 are contacted by, e.g. welded with, the two contacts 16 of a connector plug 17 for taking off signals. The conductor end portions 115 of the current conductors 15 on the coil end are bent and project away from the coil 14. However, the resulting bend of the current conductors 15 is as close as possible to the coil bounding portion 20 of the coil body 13. By coil bounding portion is meant the two bounding end pieces for the coil 14 which are included in the coil body 13. The respective winding end portions 114 of the coil 14 are fastened to the conductor end portions 115 of the current conductors 15. A magnet core 22 serving as a so-called pole pin, which projects through the coil 14 is inserted in the coil body 13 facing downward, i.e. toward a toothed wheel or other rotating body, not shown in the drawing, whose rotating movement is to be determined. In particular, the rotating body is made of magnetically conducting material.

The current conductors 15 are arranged in a longitudinal groove 25 formed in the coil body 13. According to the invention, region 18, i.e. the region where the winding end portions 114 of the windings of the coil 14 contact the current conductor 15, is completely enclosed by silicone 26. Any other permanently elastic material may also be used instead of silicone 26. For example, other gel-like or gelatinous materials would also be suitable for this purpose. It is important that a free space be provided for this region 18 within the injected molded housing in which the end portions of the coil wire can expand freely due to fluctuations in temperature. Further, no air or other gases may be enclosed in this region. The coil wire must be prevented from vibrating due to vibrational loads. Further, the silicone 26 is covered by a circumferential element 28 toward the housing 10. Temperature-resistant adhesive tapes or thin sleeves are suitable for the circumferential element 28. The circumferential element 28 must be made of electrically insulating material particularly when it covers the coil 14 at the same time as shown in the drawing.

To fasten the sensor 11 to a housing, e.g. in a vehicle, a fastening bracket 29 is embedded in a flange-like projection 30 in the housing 10.

The operation of the speed sensor is sufficiently known and therefore need not be described in more detail. A magnetic field is generated by the coil 14 when current passes through the latter. When the toothed wheel moves past the tip of the magnet core 22, the distance, i.e. the air gap, between the pole pin and toothed wheel changes during the movement of the toothed wheel due to the teeth and the gaps between the teeth. The magnetic field is accordingly also influenced and a measurement signal is generated in this way. It will be understood that each of the elements described above, or two or more together, may also find a useful application in other types of structures differing from the types described above.

While the invention has been illustrated and described as embodied in a long-lasting inductive sensor with an electrical coil having improved load-bearing and thermal properties, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. Inductive sensor (11) comprising
   a housing (10);
   a coil body (13) and at least one coil (14) arranged on the coil body, said coil body (13) with said at least one coil (14) being located inside said housing (10) and said at least one coil (14) including a winding having winding end portions (114);
   current conductors (15) having conductor end portions (115) and arranged in said housing (10), said conductor end portions (115) electrically contacting said winding end portions (114) of said windings in a contact region (18) inside said housing (10);
   a permanently elastic material (26) enclosing said contact region (18) between said conductor end portions (115) and said winding end portions (114); and
   a circumferential element (28) made of a temperature-resistant material and enclosing said contact region (18) between said conductor end portions (115) said current conductors (15) and said winding end portions (114) of said windings of said at least one coil (14).

2. Inductive sensor according to claim 1, wherein the permanently elastic material (26) is gelatinous.

3. Inductive sensor according to claim 1, wherein the permanently elastic material (26) is silicone.

4. Inductive sensor according to claim 1, wherein the circumferential element (28) is a temperature-resistant adhesive tape.

5. Inductive sensor according to claim 1, wherein the circumferential element (28) is a polyimide strip.

6. Inductive sensor according to claim 1, wherein the circumferential element (28) is a sleeve bearing on the housing.

7. Inductive sensor according to claim 1, wherein the housing (10) is made from an injection molding compound.

8. Inductive sensor according to claim 1, comprising a speed sensor.

* * * * *